United States Patent [19]

Sasayama

[11] 4,211,851

[45] Jul. 8, 1980

[54] PROCESS FOR THE PREPARATION OF SELF-SWELLING LEAKAGE-PREVENTING MATERIALS

[75] Inventor: Hiroharu Sasayama, Ageo, Japan

[73] Assignee: C.I. Kasei Company Limited, Tokyo, Japan

[21] Appl. No.: 965,377

[22] Filed: Nov. 30, 1978

Related U.S. Application Data

[63] Continuation-in-part of Ser. No. 825,018, Aug. 16, 1977, Pat. No. 4,155,957.

[30] Foreign Application Priority Data

Aug. 23, 1976 [JP] Japan ................................ 51/100388

[51] Int. Cl.$^2$ ...................... C08L 23/22; C08L 23/26; C08L 23/36; C08L 35/00
[52] U.S. Cl. ..................................... 525/108; 428/288; 428/394; 428/396; 525/194; 525/207
[58] Field of Search .................. 260/896, 897, 30.4 R, 260/30.4 N, 32.6 PQ, 32.6 N, 33.4 PQ; 526/16; 428/394, 396

[56] References Cited

U.S. PATENT DOCUMENTS

| 3,642,726 | 2/1972 | Hellman | 260/78.5 T |
|---|---|---|---|
| 3,765,829 | 10/1973 | Lambert | 260/897 B X |
| 3,966,672 | 6/1976 | Gaylord | 260/42.14 |

OTHER PUBLICATIONS

"Concise Chemical and Technical Dictionary" H. Bennett, 1974, p. 17.

*Primary Examiner*—Carman J. Seccuro
*Attorney, Agent, or Firm*—Sprung, Felfe, Horn, Lynch & Kramer

[57] ABSTRACT

A self-swelling leakage-preventing material is produced by reacting under heat a mixture of a copolymer of a lower olefin such as isobutene with maleic anhydride, a polymer emulsion having compatibility with the copolymer, such as an acrylic polymer emulsion, and a compound having at least two functional groups in a molecule selected from the group consisting of a hydroxy group, amino group and epoxy group, such as ethylene glycol, until a crosslinked product having a swelling ratio of 5-40 times is obtained. The mixture itself may be shaped into a suitable form prior to the reaction. A core material such as a non-woven fabric may be impregnated with the mixture prior to the reaction.

5 Claims, No Drawings

PROCESS FOR THE PREPARATION OF SELF-SWELLING LEAKAGE-PREVENTING MATERIALS

BACKGROUND OF THE INVENTION

This is a continuation-in-part application of a copending application Ser. No. 825,018 filed Aug. 16, 1977, now U.S. Pat. No. 4,155,957.

The present invention relates to a process for the production of a novel self-swelling leakage-preventing material capable of swelling by absorption of water and preventing leakage of water by clogging interstices.

In public works and construction works, cracks, cleavages or interstices are often formed in the places where mortar or concrete has been applied or wherein water-supplying pipes are jointed, and often make a cause of leakage of water. In the prior art, such cracks or interstices are filled with a leakage-preventing material based on rubber, plastics and bitumen, such as rubber packing materials, rubber sealants and bitumen jointing materials. In the lapse of time after the application of these caulking materials, there may often begin leakage of water again in the same place where these materials have been applied due to the shrinkage of the materials by degradation or by the widening of the interstices per se. A leakage-preventing material of such types as can be swollen with the penetrating water and can seal interstices or pores to prevent the leakage of water was also proposed to overcome the drawbacks caused by the above mentioned materials. However, such a self-swelling material also cannot be used with stability for a long period of time because of its poor swelling ratio and poor gel strength. Thus, there has not yet been found a practically advantageous leakage-preventing material in this art.

As a result of extensive researches undertaken to develop a leakage-preventing material which is capable of being swollen with water easily and has satisfactorily high gel strength and swelling ratio and which can maintain these useful properties unaltered for a long period of time, it has now been found that such purpose can be achieved by subjecting a composition composed of a copolymer having acid anhydride residues, an acrylic polymer emulsion having compatibility with the copolymer and a polyhydric or polyfunctional compound to form a crosslinked product having a desired swelling ratio. The present invention has been accomplished on the basis of the above discovery.

BRIEF SUMMARY OF THE INVENTION

In accordance with the present invention, there is provided a process for the production of a self-swelling leakage-preventing material, characterized by reacting under heat a mixture of (a) a copolymer of a lower olefin and maleic anhydride, (b) an acrylic polymer emulsion having compatibility with the copolymer and (c) a compound having at least two functional groups selected from the class consisting of hydroxy groups, amino groups and epoxy groups, until a crosslinked product having a swelling ratio of 5–40 times with water is obtained.

It is an object of the present invention to provide a process for the production of a novel self-swelling leakage-preventing material.

It is another object of the present invention to provide a process for the production of a self-swelling leakage-preventing material having an unexpectedly large swelling ratio.

It is a further object of the present invention to provide a process for the production of a self-swelling leakage-preventing material which can exhibit good leakage-preventing effect for a long period of time and is not deteriorated in its effect even when it undergoes repeated cycles of drying and swelling.

Other objects, features and advantages of the present invention will be apparent from the following description.

DETAILED DESCRIPTION OF THE INVENTION

The copolymer utilizable in the present invention as the above component (a) can be obtained by copolymerizing a lower olefin such as ethylene, propylene, n-butene, isobutene, 1-pentene, 2-pentene or 2-hexene and maleic anhydride in an organic solvent such as dimethylformamide in the presence of a free-radical polymerization initiator such as a persulfate. The molar ratio of the lower olefin and maleic anhydride to be copolymerized is preferably within the range of 70 to 50 mole % of the former and 30 to 50 mole % of the latter. This copolymer is advantageously converted, prior to use, into a water-soluble form, for example, by neutralization with ammonia water.

The acrylic polymer emulsion used as the component (b) in the inventive leakage-preventing material is a known polymer emulsion having compatibility with the component (a) above and prepared readily by emulsion-polymerizing one or more of acrylic monomers, optionally, with one or more of non-acrylic comonomers having or not having reactive functional groups in an aqueous medium. Illustrative of such an acrylic monomer are acrylic acid, methacrylic acid, esters thereof with an alkyl group, e.g. methyl, ethyl, n-propyl, isopropyl, n-butyl, sec-butyl, tert-butyl, isobutyl, hexyl, cyclohexyl, octyl, 2-ethylhexyl, nonyl, dodecyl, tetradecyl and the like, with a glycidyl group, with an amino-substituted alkyl group, e.g. dimethylaminoethyl, tert-butylaminoethyl and the like and with a hydroxy-substituted alkyl group, e.g. 2-hydroxyethyl, 2-hydroxypropyl and the like, acrylamide, methacrylamide, N-methylolacrylamide, acrylonitrile, methacrylonitrile and acrolein. Preferred acrylic monomers are ethyl acrylate, butyl acrylate and methyl methacrylate.

Examples of the non-acrylic comonomers copolymerizable with the above named acrylic monomers are styrene, vinyl acetate, glycidyl-containing monomers, e.g. allyl glycidyl ether, amino-containing monomers, e.g. vinylpyridine, carboxyl-containing monomers, e.g. crotonic acid, itaconic acid and half esters thereof and maleic acid and half esters thereof, maleic anhydride, itaconic anhydride, hydroxy-containing monomers, e.g. allyl alcohol and monoallyl ethers of polyvalent alcohols, and unsaturated isocyanate compounds, e.g. vinyl isocyanate and allyl isocyanate.

When the component (b) is a polymer emulsion of an acrylic copolymer with one or more of the above named non-acrylic comonomers, it is recommended that at least 50 mole % of the monomeric composition is the acrylic monomer. The acrylic polymer emulsion as the component (b) is used in an amount of 20–100 parts by weight or, preferably, 50–60 parts by weight as solid per 100 parts by weight of the component (a).

Illustrative of the polyfunctional compounds used as the component (c) in the present invention are hydroxy-containing compounds such as ehtyleneglycol, propyleneglycol, glycerin, polyethyleneglycol, polypropyleneglycol, trimethylolpropane, pentaerithritol and the like, amines or amino-containig compounds such as triethanolamine, ethylenediamine, propylenediamine and the like and epoxy-containing compounds such as diglycidyl ether and various kinds of commercially available epoxy containing prepolymers. These compounds are used in an amount such that 1–10 moles of the functional groups are given per mole of the carboxyl groups present in the copolymer as the component (a).

In the present invention, the mixture of the above components (a), (b) and (c) may be admixed, if desired, with a foaming agent, an antioxidant, a dye, a pigment and other conventional additives.

A mixture prepared in this manner by mixing the individual components (a) to (c) is optionally admixed with an appropriate amount of water and shaped into a desired form, for example, a sheet or block. Alternatively, a fibrous core material such as non-woven fabrics, woven cloths, ropes, knit cloths, rovings or strings is impregnated with the mixture. The shaped article or the impregnated core material is dried for dehydration and subjected to heating until a crosslinked product having a swelling ratio of 5–40 times in water is obtained. The swelling ratio is obtained as a ratio of the weight of the material after dipping in water at 20° C. for 3 hours to the weight of the mateiral before dipping in water. It is of course that, when the leakage-preventing material is prepared by impregnating a core material, e.g. non-woven fabric, with the polymeric mixture, the weight of the core material is not included in the above calculation.

It is necessary in the present invention to perform the crosslinking reaction until the swelling ratio of the resultant crosslinked product becomes 5–40 times. If the crosslinking reaction proceeds so far as to give a swelling ratio exceeding the above range, the resultant product will no longer exhibit the function necessary as swelling leakage-preventing material. On the other hand, if the crosslinking reaction fails to proceed to such a stage that the product may have the above defined swelling ratio, the product obtained will be poor in gel strength so that no satisfactory leakage-preventing effect can be expected.

A proper heating condition includes a period from 10 minutes to 8 hours at a temperature of 80°–120° C. or, preferably, 1 to 4 hours at 80° to 100° C.

In case the leakage-preventing material is to be shaped by extrusion or calendering of the mixed composition, preferred content of water in the composition is usually 5–40% or, more preferably, 10–30%. In case the leakage-preventing material is shaped by spreading of the composition or by impregnating a core material with the composition, the content of water in the composition is increased to 30–70% or, preferalby, 40–60%.

Heretofore, a contradictory relation is known between the swelling ratio in water and the gel strength; increase in the swelling ratio by absorption of larger volume of water incurs decrease in the gel strength, while enhancement of the gel strength leads to the reduction of the swelling ratio. According to the present invention, however, unexpectedly remarkable advantages can be obtained in that the gel strength can remarkably be enhanced without reducing the swelling ratio by the addition of the acrylic polymer emulsion which, in the prior art, has been thought to have undesirable effects on the swelling by absorption of water by the reason that the polymer in the emulsion forms hydrophobic films after drying and subsequent heating.

The leakage-preventing material obtained according to the present invention filling the interstices of structures well complies with any widening of the interstices caused by dimensional change of the structures so that the material can exhibit a stable leakage-preventing effect for a long period of time. Further, the leakage-preventing material has an advantage in that its effect is not adversely affected even in the event that the material undergoes repeated cycles of drying and swelling. Thus, the material is particularly suitable as a sealant for filling up gaps between segments in tunnel construction, a sealant for a joint portion of Hume concrete pipes, a sealant for filling up interstices in the outer wall panels of buildings, and a wind-seal.

The present invention will now be illustrated in further detail by way of examples, in which parts are all given by parts by weight.

In the examples, the test for the leakage-preventing power was undertaken in such a manner that two flanged pipes were connected at the flanges with a sheet of the inventive material placed therebetween with four sets of bolts and nuts at a fastening pressure of 400 kg/cm$^2$ and water was poured into the pipes so as that the sheet material could absorb water followed by pressurizing with water with the distance of the flanges being increased by 2 mm by use of a spacer. The pressure of water at which leakage of water began was recorded as the leakage-preventing power of the material.

The test for leakage-preventing power undertaken with the above sheet material indicated that the sheet material could withstand more than 7.5 kg/cm$^2$ of water pressure.

EXAMPLE 1 (Experiments No. 1 and No. 2 and Comparative Experiments No. 1, No. 2 and No. 3).

A mixture was prepared by uniformly blending an equimolar copolymer of isobutylene and maleic anhydride neutralized with ammonia (Isobam-110, product of Kuraray Co.), an aqueous emulsion containing 45% by weight of a reactive polymer of acrylic ester (Voncoat R-3000, product of Dainippon Ink Kagaku Co.), a polyethyleneglycol with an average molecular weight of about 200 and water in amounts as indicated in the table below and a polyester non-woven fabric with a basis weight of 60 g/m$^2$ was impregnated with the thus prepared mixture to give a pick-up amount of about 600 g/m$^2$ as dried. The impregnated sheets were dried by heating at 90° C. for 15 minutes and further heated at 80° C. for 4 hours to effect crosslinking of the polymer components.

The thus prepared leakage-preventing sheet materials were kept in water at 20° C. for 3 hours and the swelling ratios were determined to give the results as shown in the table together with the amounts of the gelled polymeric material coming off the sheet materials by dipping in water. The table also gives the results of the test for the leakage-preventing power undertaken with these sheet materials.

Table

|  |  | Experiment | | Comparative Experiment | | |
|---|---|---|---|---|---|---|
|  |  | No. 1 | No. 2 | No. 1 | No. 2 | No. 3 |
| Formulation, parts by weight | Isobam-110 | 100 | 100 | 100 | 100 | 100 |
|  | Voncoat R-3000 | 170 | 100 | — | 300 | 20 |
|  | Polyethyleneglycol | 60 | 60 | 100 | 60 | 60 |
|  | Water | 300 | 300 | 300 | 150 | 350 |
| Properties | Swelling ratio, times | 12.8 | 31.0 | 15.3 | 2.3 | 48.3 |
|  | Gelled material coming off, % | 15.2 | 37.5 | 46.3 | 1.4 | 65.0 |
|  | Leakage-preventing power, $kg/cm^2$ | >7.5 | >7.5 | 3.0 | 0.5 | 0.5 |

EXAMPLE 2

The same experimental procedure as in Example 1 was repeated with the mixture for impregnating the non-woven fabric prepared with 100 parts of the same isobutylene-maleic anhydride copolymer, 170 parts of an aqueous emulsion of a styrene-acrylic ester copolymer with a solid content of 46% by weight (Voncoat 5000, product of Dainippon Ink Kagaku Co.), 30 parts of ethylenediamine and 300 parts of water. The swelling ratio of the thus prepared leakage-preventing sheet material was 11.5 times with about 11.0% of the gelled material coming off the sheet.

The result of the test for leakage-preventing power of this sheet material was 7.5 $kg/cm^2$ or higher.

EXAMPLE 3

The same experimental procedure as in Example 1 was repeated with the mixture for impregnating the non-woven fabric prepared with 100 parts of the same isobutylene-maleic anhydride copolymer, 170 parts of an aqueous emulsion containing 45% by weight of a self-crosslinkable copolymer of acrylic esters (Voncoat R-3360, product of Dainippon Ink Kagaku Co.), 100 parts of an epoxide compound with an epoxy equivalency of about 200 (Epiclon EM-85, product of Dainippon Ink Kagaku Co.) and 300 parts of water. The swelling ratio of the thus prepared leakage-preventing sheet material was 10.3 times with about 10.1% of the gelled material coming off the sheet.

The result of the test for the leakage-preventing power of this sheet material was 7.5 $kg/cm^2$ or higher.

What is claimed is:

1. A process for the preparation of a self-swelling leakage-preventing material comprising drying and heat-treating a liquid mixture composed of
    (a) a copolymer of a lower olefin and maleic anhydride,
    (b) 20-100 parts by weight as solid per 100 parts by weight of (a) of an aqueous emulsion of an acrylic polymer having compatibility with the component (a) and containing at least one polymerized monomer selected from the group consisting of substituted and unsubstituted acrylic acids, acrylic acid esters, acrylamides, acrylonitriles and acrolein, and
    (c) a compound having, in a molecule, at least two functional groups selected from the class consisting of a hydroxy group, amino group and epoxy group, until a crosslinked product having a swelling ratio in water of 5–40 times is obtained.

2. The process as claimed in claim 1 wherein the lower olefin is isobutene.

3. The process as claimed in claim 1 wherein the component (c) is used in an amount such that from 1 to 10 moles of the functional groups are provided per mole of the carboxyl groups in the component (a).

4. The process as claimed in claim 1 wherein the drying and heat-treatment of the liquid mixture is carried out for the liquid mixture impregnating a fibrous core material.

5. A self-swelling leakage-preventing material prepared by the process as claimed in claim 1 or claim 4.

* * * * *